United States Patent [19]

Templin

[11] 4,135,390
[45] Jan. 23, 1979

[54] ENGINE TORQUE TRANSDUCER USING A SPOKED TORQUE TRANSMITTING PLATE

[75] Inventor: Jackson R. Templin, Anderson, Ind.

[73] Assignee: General Motors Corporation, Detroit, Mich.

[21] Appl. No.: 877,100

[22] Filed: Feb. 13, 1978

[51] Int. Cl.² .............................................. G01L 3/14
[52] U.S. Cl. .................................................. 73/136 C
[58] Field of Search ..................................... 73/136 C

[56] References Cited

U.S. PATENT DOCUMENTS

| | | | |
|---|---|---|---|
| 2,173,039 | 9/1939 | Muir | 73/136 C |
| 2,403,952 | 7/1946 | Ruge | 73/136 C |

*Primary Examiner*—Charles A. Ruehl
*Attorney, Agent, or Firm*—Warren D. Hill

[57] ABSTRACT

An engine output shaft is bolted to the hub of a drive plate or flex plate, the outer periphery of which is fastened to the torque converter of an automatic transmission such that the engine torque is transmitted by the drive plate from the engine to the transmission. An arcuate array of slots extending between the hub and the periphery of the drive plate define a plurality of spokes which carry the torque. The spokes bend or flex by an amount which is proportional to the torque. A pair of electromagnetic pickups are secured to the engine adjacent the inner and outer ends of the spokes respectively in order to obtain a measure of the spoke deflection and, therefore, of torque. A torque signal is electronically derived from the output of the pickups.

7 Claims, 10 Drawing Figures

ENGINE TORQUE TRANSDUCER USING A SPOKED TORQUE TRANSMITTING PLATE

This invention relates to a torque sensor and particularly to such a sensor for measuring the torque delivered by an automotive engine to a transmission through a rotatable torque transmitting plate.

Advanced technology of controlling vehicle engines particularly with regard to fuel control and ignition control has taken advantage of engine torque information. While that information was at one time obtained by measuring manifold pressure, that method gave only approximate results and changes in engine design have made manifold pressure even less reliable as a measure of engine torque. It is thus desirable to provide an alternate source of engine torque information which is accurate.

It is, therefore, a general object of this invention to provide a torque sensor for measuring the torque delivered by an automotive engine to a transmission. It is a further object of the invention to use a modified drive plate or flex plate as a source of torque information.

The invention is carried out by providing a drive plate coupled at its hub to an engine and at its periphery to a transmission and to provide spokes connecting the hub to the periphery such that the engine torque is carried by the spokes and the spokes flex in accordance with the amount of torque transmitted from the engine to the transmission. The invention further contemplates the use of detectors responsive to the passage of each spoke to measure the amount of deflection and, therefore, the torque transmitted through the spokes.

The above and other advantages will be made more apparent from the following specification taken in conjunction with the accompanying drawings wherein like reference numerals refer to like parts and wherein:

FIG. 5b is a section of a pair of spokes taken along the line 5b of the FIG. 5a;

Figure 1:
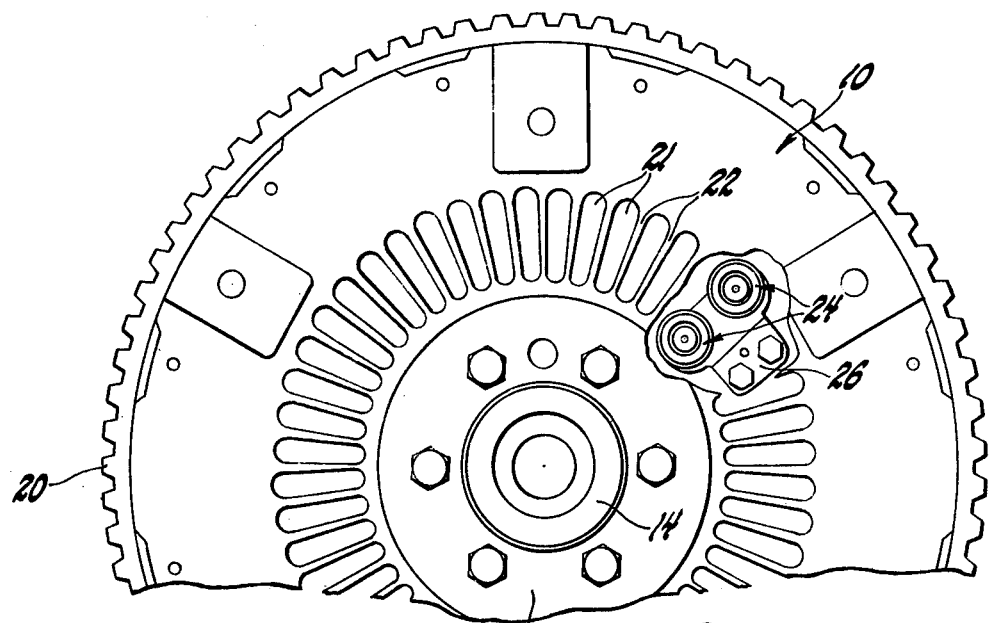
FIG. 1 is an elevational view of a torque sensor according to the invention comprising a drive plate modified as a torque transducer and including a cutaway portion revealing electromagnetic pickups which form a part of the torque sensor.
Figure 2:
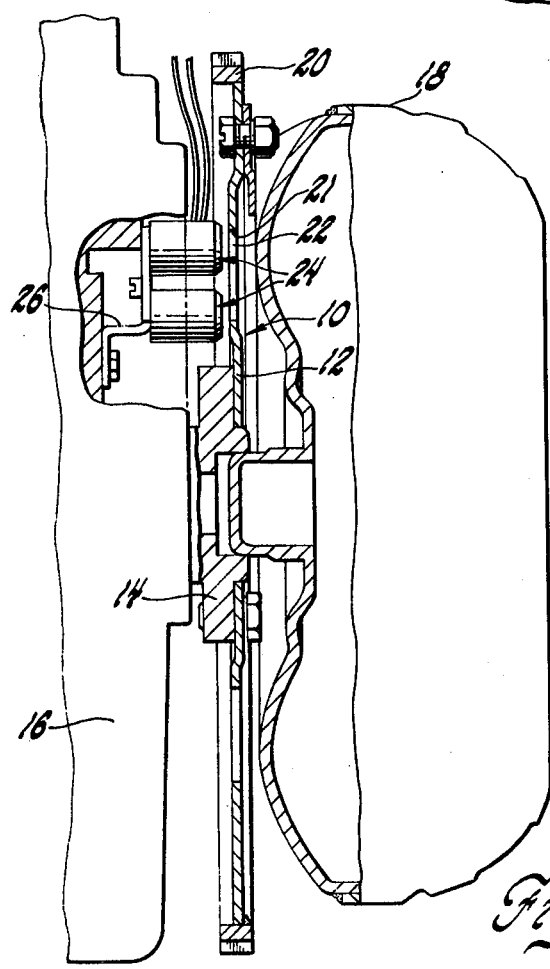
FIG. 2 is a side view of the torque sensor of FIG. 1 as it is coupled to the torque converter of an automatic transmission.

To provide a torque sensor on an automobile engine, an existing part of the engine is modified for use in the torque sensor in conjunction with a pickup mechanism which is readily added to the engine; specifically, the flex plate or drive plate is modified to respond to torque in a measurable way. As seen in FIGS. 1 and 2 of the drawings, the flex plate or drive plate 10 has a hub 12 bolted to the crankshaft 14 of an engine 16 and the periphery or circumferential portion of the plate 10 is bolted to the torque converter 18 which is a part of an automatic transmission, not shown. A ring gear 20 is secured to the periphery of the plate 10 to provide coupling with the engine starter, not shown. As thus far described, the flex plate or drive plate is of conventional configuration and is commonly used to provide the mechanical coupling between the engine crankshaft and the torque converter of an automatic transmission. In addition to transmitting torque from the engine to the torque converter housing, it flexes to allow axial movement of the converter housing relative to the engine which occurs with changes in speed and temperature.

As best seen in FIG. 1, an arcuate series of oval slots 21 concentric with the hub of the drive plate is formed between the hub and the periphery thereby defining a series of thin resilient spokes 22 of rectangular cross-section connecting the hub 12 with the periphery or circumferential portion and, therefore, transmitting the torque from the engine to the transmission. The resilient spokes 22 flex to allow a measurable amount of angular displacement between the hub and the periphery of the drive plate, the amount of flexure being proportional to torque. In order to measure that flexure, the relative position of radially spaced portions of each of the spokes is measured by a pair of electromagnetic variable reluctance pickups 24 mounted to the engine 16 by a bracket 26. The pickups are arranged to be adjacent to the spokes 22 but spaced therefrom sufficiently to allow axial movement of the drive plate 10. Electrical circuitry to be described below coupled to the pickups 24 senses the time of passage of the inner and outer portion of each spoke and compares the timing of those two events to derive the degree of spoke flexure and therefore of torque.

Figure 3:
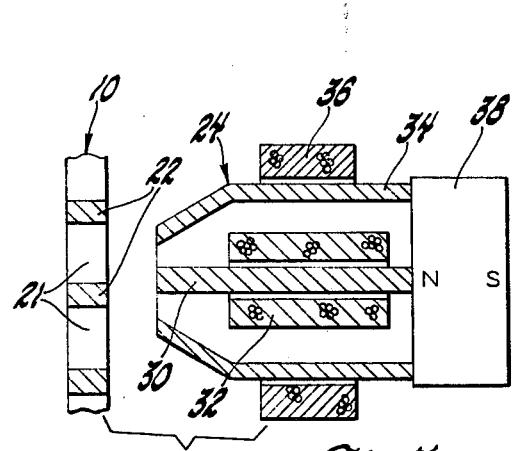
FIG. 3 is a detailed view of an electromagnetic pickup adjacent a sectioned view of an array of spokes illustrating the operation of the electromagnetic pickup.

FIG. 3 illustrates one of the magnetic pickups 24 adjacent a series of spokes 22 shown in cross section. The pickup comprises a central magnetic polepiece 30 surrounded by an electrical coil 32, a tubular magnetic polepiece 34 that surrounds both the polepiece 30 and the coil 32 and a second coil 36 that surrounds the tubular polepiece 34. Both of the polepieces are attached to one pole of a permanent magnet 38. The end of the tubular polepiece 34 nearest the spokes 22 tapers in toward the central polepiece 30 but the diameter at the terminus of the tubular polepiece 34 is fairly large with respect to the size and spacing of the spokes 22. As the spokes move past the pickup, the reluctance of the magnetic path through the polepiece 34 does not vary appreciably. That reluctance, however, does change in response to changes in spacing of the pickup 24 from the path of the spokes 22. The central polepiece 30 is relatively small so that the magnetic reluctance of its magnetic circuit is altered substantially with the passage of each spoke 22, and corresponding current pulses are induced in the coil 32 as each spoke 22 passes. Changes in the spacing between the polepiece 30 and the path of the spokes 22 also varies the reluctance of the magnetic circuit of polepiece 30. By connecting the coils 32 and 36 in opposition, the part of the signal in coil 32 due to changes in spacing between the pickup and the path of the spokes 22 is cancelled out and the remaining signal reflects the movement of the spokes 22.

Figure 4:
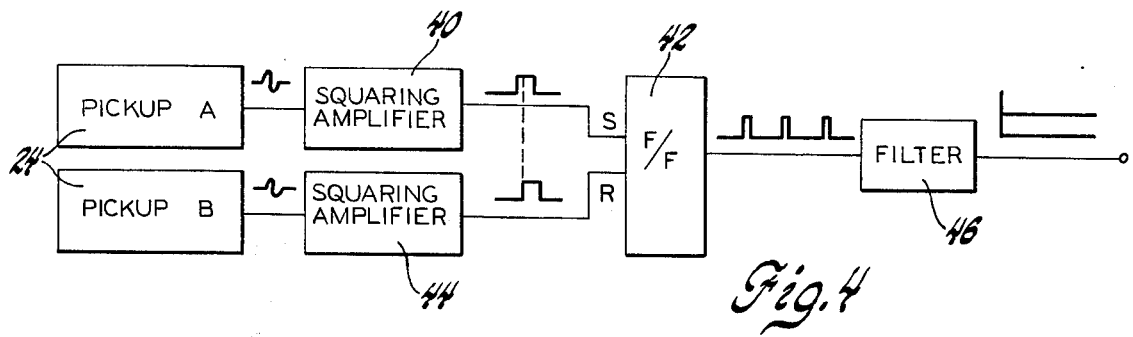
FIG. 4 is a block diagram of an electrical circuit for deriving from the pickup outputs a signal representing torque.

In FIG. 4, the two pickups 24 are denoted "pickup A" and "pickup B". The pickup A is connected to a squaring amplifier 40 which, in turn, is connected to the "set" input of a flip-flop 42. The pickup B is connected through a squaring amplifier 44 to the "reset" input of the flip-flop 42. The output of the flip-flop is a fixed positive voltage when it is "on" and ground potential when it is "off". That output is connected to an active filter 46 which produces an output signal which is the average D.C. value of the flip-flop output and is therefore proportional to torque. The pickups 24 are initially adjusted when the drive plate 10 is moving under a zero torque condition so that pickup B is arranged to lag pickup A by a very small amount and when the flip-flop is set by the signal from pickup A it will be almost immediately reset by a signal from a pickup B. The square wave pulse output from the flip-flop 42 will be a train of very thin pulses having nearly zero percent duty cycle. That is, the "on" time of the flip-flop output is extremely small with respect to the "off" time and when that signal is filtered by the circuit 46, the output signal is essentially zero. When, however, torque transmission by the drive plate causes flexure of the spokes 22, the phase of the pickup output signals will change according to the amount of torque. The pickup B will be arranged farther from the hub 12 than the pickup A so that its signal will lag that of pickup A. Then the leading edge of the output from the squaring amplifier 40 will occur a significant time before the leading edge of the output from the squaring amplifier 44 so that the flip-flop 42 will have an output of pulses of substantial width having a duty cycle proportional to the torque. The filter 46 then produces a D.C. voltage level proportional to the duty cycle and, therefore, proportional to the torque transmitted by the drive plate.

Figure 5A:
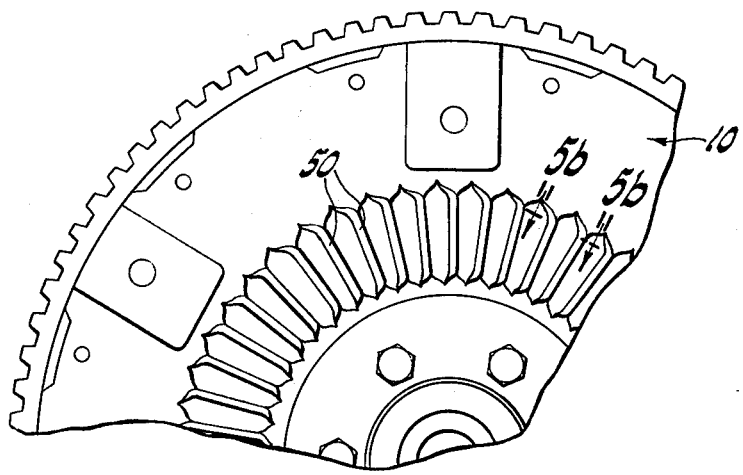
FIG. 5a is an elevational view of a segment of a flywheel according to a second embodiment of the invention.
Figure 5B:
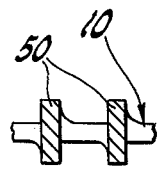

FIGS. 5a and 5b illustrate an embodiment of the drive plate 10 wherein the slots formed between the spokes 50 are narrower than those in FIG. 1 so that the spokes are wider, and the spokes 50 are then bent through an angle of 90° to provide a configuration which has much increased axial stiffness as compared to that of FIG. 1 with only nominally increased torsional stiffness.

Figure 6:
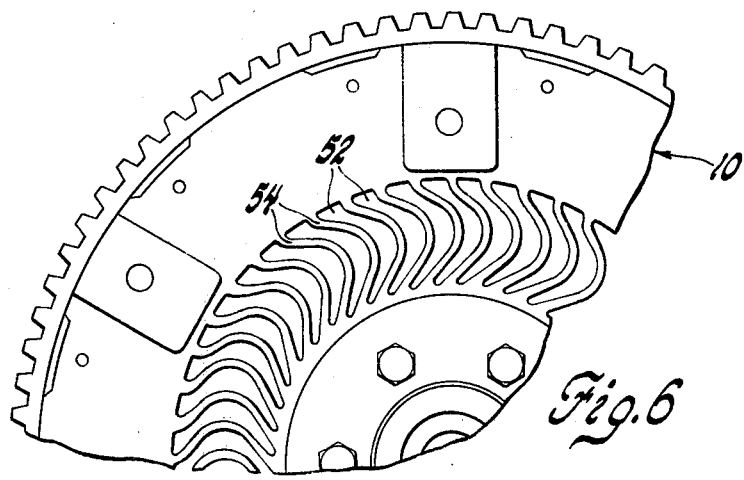
FIG. 6 is an elevational view of a segment of a flywheel modified according to a third embodiment of the invention.
Figure 7:
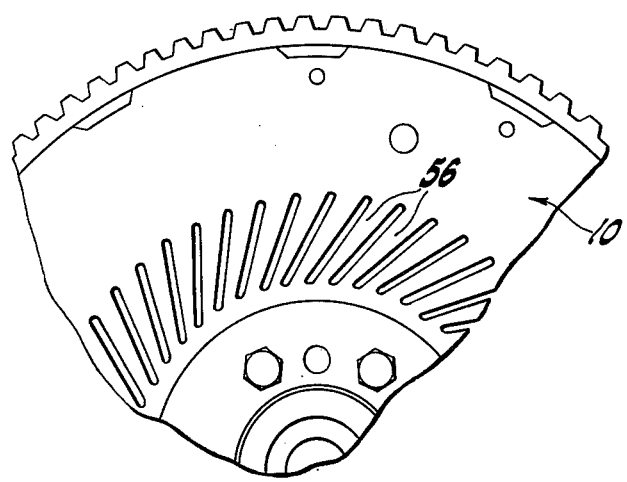
FIG. 7 is an elevational view of a segment of a flywheel modified according to a fourth embodiment of the invention.

FIG. 6 illustrates another embodiment of the drive plate 10 wherein the slots 52 are formed to produce curved spokes 54. Because the spokes are longer than those of say FIG. 1, although of comparable thickness and width, the axial and torsional stiffness are substantially reduced. In FIG. 7, the drive plate 10 has spokes 56 which are straight but canted at an angle to the radius of the plate. Further, the spokes increase in width toward the circumference of the disk.

Figure 8:
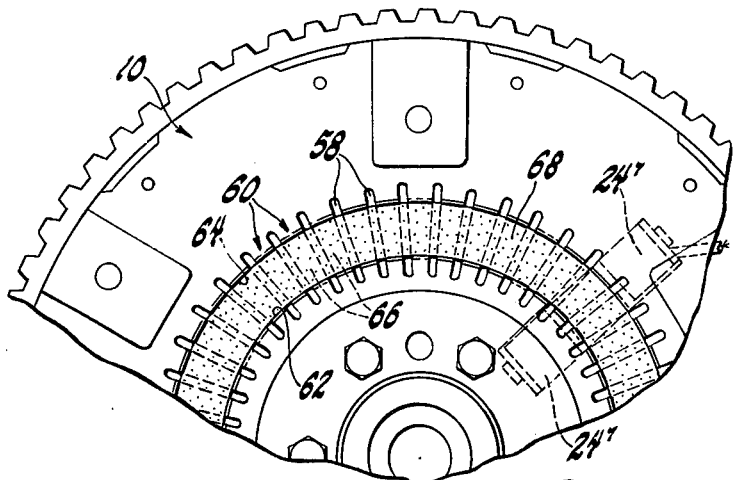
FIG. 8 is an elevational view of a flywheel modified according to a fifth embodiment of the invention.
Figure 9:
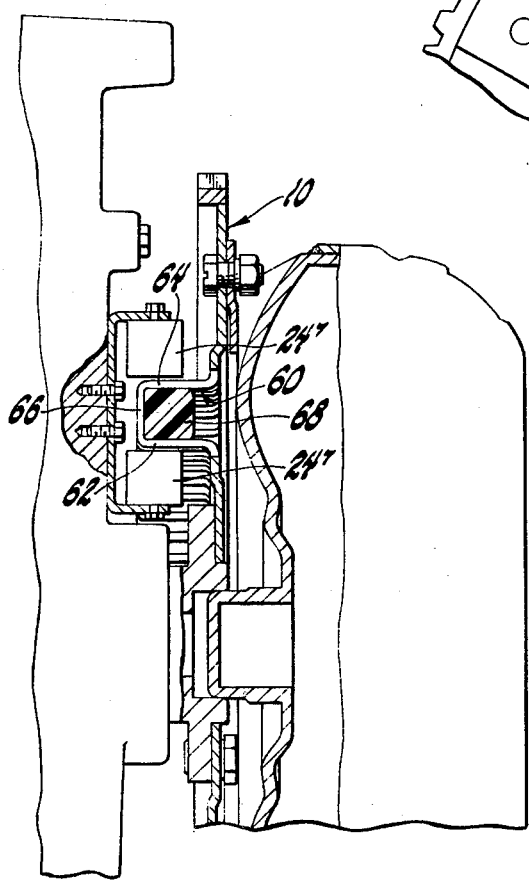
FIG. 9 is a side view of the torque sensor of FIG. 8.

FIGS. 8 and 9 illustrate a drive plate 10 wherein the slots 58 in the drive plate are radially oriented but, as best shown in FIG. 9, the spokes 60 are formed into a U shape and extend out of the plane of the drive plate 10. In particular, each U-shaped spoke comprises an inner and outer leg portion 62 and 64 respectively normal to the plate 10 and a bottom interconnecting portion 66 parallel to the plane of the drive plate 10. The pickup coils 24' are located on either side of the U-shaped spokes. That is, one of the coils 24' is mounted radially inwardly of the leg portion 62 of the spoke 60 while the other coil 24' is mounted outwardly of the leg portion 64 of the spoke 60. Since axial flexing of the drive plate 10 does not alter the distance between the pickups and the spokes, the pickups 24 can be mounted quite close to the path of the spokes 60. The resultant smaller air gaps will improve the efficiency of the pickups. In addition, the effective lengths of the spokes are substantially increased compared to the FIG. 1 configuration allowing much greater torsional flexure for the same torque. An annular mass of elastomer material 68 is nested in the U-shaped cavity defined by the spokes so that damping is provided for the resulting spring mass system of engine and flex plate and the various inertias which are part of the system.

It will thus be seen that a torque sensor has been provided for an engine which accurately and responsively measures the torque transmitted by the engine to the transmission and that the invention is readily applied to a conventional automotive vehicle with an automatic transmission with only minor modifications in the structure of the existing components and the addition of a simple electromagnetic pickup.

The embodiments of the invention in which an exclusive property or privilege is claimed are defined as follows:

1. A torque sensor for sensing the torque delivered by an automotive engine to a transmission wherein the engine output includes a rotatable driving element and the transmission input includes a rotatable driven element, comprising; a generally disc-shaped torque transmitting plate formed of resilient material for transmitting torque between said driving and driven elements, said plate having an inner hub portion connected to one of said elements and a circumferential portion connected with the other of said elements, an arcuate array of spaced slots formed in said plate concentrically with said hub portion, the slots defining therebetween resilient torque transmitting spokes interconnecting said hub portion and said circumferential portion for transmitting torque between said driving and driven elements, said spokes being subject to being flexed by an amount which is a function of the torque being transmitted between said driving and driven elements so as to assume a canted relationship to their unflexed orientations, and detector means effective during plate rotation to produce an electrical output responsive to the passage of spaced portions of the resilient spokes past the detector means, the electrical output varying in accordance with spoke flexure caused by the torque transmitted through the spokes.

2. A torque sensor as defined in claim 1 wherein the spokes are evenly spaced and nominally straight and extend radially from said hub portion.

3. A torque sensor as defined in claim 1 wherein each spoke is straight and canted to extend from the hub at an angle to the radial direction.

4. A torque sensor as defined in claim 1 wherein each spoke has a rectangular cross section having a major and a minor dimension, each spoke is straight along a longitudinal axis and is twisted about its longitudinal axis to have its major dimension lie in a plane transverse to the plane of the said torque transmitting plate.

5. A torque sensor is defined in claim 1 wherein the slots are curved to define curved spokes extending in pin-wheel fashion from the said hub portion.

6. A torque sensor for sensing the torque delivered by an automotive engine to a transmission wherein the engine output includes a rotatable driving element and the transmission input includes a rotatable driven element, comprising; a generally disc-shaped torque transmitting plate formed of resilient material for transmitting torque between said driving and driven elements, said plate having an inner hub portion connected to one of said elements and a circumferential portion connected with the other of said elements, an arcuate array of spaced slots formed in said plate concentrically with said hub portion, the slots defining therebetween resilient torque transmitting spokes of rectangular cross section interconnecting said hub portion and said circumferential portion for transmitting torque between said driving and driven elements, said spokes being subject to being flexed by an amount which is a function of the torque being transmitted between said driving and driven elements so as to assume a canted relationship to their unflexed orientations, each spoke having a U-shaped configuration extending out of the plane of the torque transmitting plate and comprising first and second leg portions projecting laterally from the hub portion and circumferential portion respectively and an integral leg connecting portion spaced from the plane of the said plate, and detector means effective during plate rotation to produce an electrical output responsive to the passage of the said leg portions of the resilient spokes past the detector means, the electrical output varying in accordance with spoke flexure caused by the torque transmitted through the spokes.

7. A torque sensor for sensing the torque delivered by an automotive engine to a transmission wherein the engine output includes a rotatable driving element and wherein the transmission input includes a rotatable driven element, comprising; a generally disc-shaped torque transmitting plate formed of resilient material for transmitting torque between said driving and driven elements, said plate having an inner hub portion connected to one of said elements and a circumferential portion connected with the other of said elements, an arcuate array of spaced slots formed in said plate concentrically with said hub portion, the slots defining therebetween resilient torque transmitting spokes of rectangular cross section interconnecting said hub portion and said circumferential portion for transmitting torque between said driving and driven elements, said spokes being subject to being flexed by an amount which is a function of the torque being transmitted between said driving and driven elements so as to assume a canted relationship to their unflexed orientations each spoke having a U-shaped configuration extending out of the plane of the torque transmitting plate and comprising first and second leg portions projecting laterally from the hub portion and circumferential portion respectively and an integral leg connecting portion spaced from the plane of the said plate, and detector means effective during plate rotation to produce an electrical output responsive to the passage of the said leg portions of the resilient spokes past the detector means, the detector means including first and second variable reluctance electromagnetic pickups arranged adjacent the first and second leg portions, respectively, of the said spokes wherein the said spaced portions, the electrical output varying in accordance with spoke flexure caused by the torque transmitted through the spokes.

* * * * *